United States Patent Office

3,335,023
Patented Aug. 8, 1967

3,335,023
REINFORCED OR COATED PAPER PRODUCED BY TREATMENT OF PAPER FIBERS WITH DECAUSTICIZED SOLUTION OF A POLYMERIC ALCOHOL XANTHATE
Douglas J. Bridgeford, 206 Prairie, Danville, Ill. 61832
No Drawing. Filed May 25, 1966, Ser. No. 552,717
23 Claims. (Cl. 117—62)

This is a continuation-in-part of co-pending applications Ser. No. 200,621 filed June 7, 1962, now U.S. Patent 3,291,789, and Ser. No. 416,795 filed Dec. 8, 1964.

This invention relates to the preparation of paper products containing cellulosic or other polymeric alcohol derivatives.

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products.

In commercial production, viscose is allowed to age until it reaches the desired ripeness and is then extruded through a die into a coagulating and/or regenerating medium (e.g., ammonium sulfate and/or sulfuric acid) to regenerate cellulose having the configuration of the die through which the viscose was extruded. If the viscose is extruded through a fine hole a filament of rayon is produced. If the viscose is extruded through a narrow slit, a film of regenerated cellulose is produced. If the viscose is extruded through a thin annular opening a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyallyl alcohol etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In my co-pending patent application Ser. No. 200,621, filed June 7, 1962, there are described several inexpensive processes for decausticizing various polymeric alcohol xanthates. In that patent application there are described processes in which alkaline solutions of various polymeric alcohol xanthates are decausticized by dialysis or by treatment with ion exchange or ion retardation materials.

Solutions of polymeric alcohol xanthates which have been decausticized as described in my prior co-pending patent application are especially useful as wet and dry strength additives for paper and for various other purposes as described in said application. Decausticized polymeric alcohol xanthate solutions can be regenerated into films or filaments or tubular casings by treatment with acid and/or by thermal regeneration. These decausticized solutions, however, contain such a high proportion of water that it has been uneconomical to manufacture such solutions for commercial use at any location other than the place at which the xanthate solution was prepared. Also, it has been found that decausticized xanthate solutions tend to decompose, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in my co-pending patent application are useful for a variety of purposes, the problems of storage and cost of shipping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent.

In the preparation of viscose and other polymeric alcohol xanthates, many undesired by-products are formed. In the past, viscose and other polymeric alcohol xanthate solutions have been regenerated by treatment with an acid with the result that large amounts of salts are formed within the regenerated material. It was previously considered impractical to reduce the proportion of salts in the regenerated polymeric alcohol product by neutralization of the aqueous caustic solutions due to the fact that any attempt to neutralize excess caustic with acid would result in a localized region of very low pH and high salt concentration which would tend to coagulate the polysaccharide and produce a heterogeneous product.

In my co-pending patent application, Ser. No. 200,621, it is reported that polymeric alcohols, principally film-forming carbohydrates or polysaccharides, such as cellulose, starch, amylose, dextran, etc., in the form of their caustic xanthate solutions, can be decausticized by dialysis, ion exchange, and/or ion retardation. The various procedures for decausticization of various xanthate solutions are described in considerable detail in that patent application.

In my co-pending patent application, Ser. No. 416,795, I have reported that decausticized solutions of polymeric alcohol xanthates, such as cellulose, starch, amylose, dextran, sugars, polyvinyl alcohol, polyallyl alcohol, etc., can be converted to finely divided, solid, stable products by spray drying. The decausticized solutions (which have been decausticized to a pH less than 13) are subjected to spray drying using a large volume of very dry heated air, at a temperature of at least 38° C. to produce a powdered polymeric alcohol xanthate product which is substantially dry and has a D.S. of at least 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

I have found that the dry decausticized xanthate powders which can be prepared in this manner can be dissolved or dispersed in water and other solvents or swell sufficiently upon admixture with water to be useful as additives in the formation of paper webs.

It was most unexpected that decausticized xanthate solutions could be spray dried. Viscose is much more stable on extended storage, both at low and elevated temperatures, than is a solution of decausticized cellulose xanthate of the same cellulose content. I have found viscose, however, to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up flow counter-current type, vertical down flow concurrent type, and vertical up flow concurrent type, although other commerical spray dryers can be used. In the spray drying of decausticized xanthate solutions, the solution is sprayed into a large volume high velocity stream of heated air or other inert gas. Air temperatures of at least 38° C. are required for effective drying and temperatures of the order of 260° C. can be used without excessive decomposition of the product. In fact, with proper adjustment of air flow rates and efficient product collection, it is possible to use air temperatures as high as 316° C. to 420° C.

It should be noted that even where high air temperatures are used the temperature surrounding each particle being dried is approximately the wet bulb temperature of the drying gas and thus the product is not subjected to temperatures substantially above the boiling point of water.

It is therefore one object of this invention to provide a new and improved paper product containing polymeric alcohol derivatives.

Another object is to provide a new and improved paper product containing a polymeric alcohol or derivative thereof prepared from a decausticized polymeric alcohol xanthate.

A feature of this invention is the provision of a new and improved paper product containing a polymeric alcohol or derivative thereof introduced in the form of a solution of a decausticized polymeric alcohol xanthate, which is subsequently insolubilized within the paper.

Still another feature of this invention is the provision of an improved paper product containing a polymeric alcohol or derivative thereof introduced by treatment of the paper or paper pulp with a solution of a polymeric alcohol xanthate decausticized to a pH less than 13, and subsequently insolubilized in the paper or pulp.

Other objects and features of this invention will become apparent from time to time throughout the specification and claims as hereinafter related.

SUMMARY OF THE INVENTION

This invention comprises new and improved paper products containing polymeric alcohols or derivatives thereof introduced into the paper in the form of a decausticized solution and subsequently insolubilized therein.

The decausticized xanthate solutions which are prepared as described in my aforementioned co-pending patent applications and the decausticized xanthate solutions which are reconstituted from the spray dried decausticized xanthate powders have been found to be especially useful as additives in the manufacture of paper. The xanthate solutions can be used as beater additives or size press additives or may be added as an off-machine coating treatment subsequent to the formation of the paper web. The xanthate solutions when impregnated in the paper web are subsequently regenerated by heat or by treatment with acid or may be insolubilized by oxidation or by reaction with a polyvalent cation. Paper products which are prepared in this manner have improved properties of wet and dry strength, fold endurance, grease holdout, printing ink reception, etc.

The following nonlimiting examples are illustrative of the preparation of the decausticized xanthate materials used in the preparation of the novel paper products which comprise this invention and are also illustrative of the process of preparation of such products and of the resulting products.

*Example 1*

A commercial viscose solution is purified by a batch dialysis technique and converted to a decausticized, dry, stable powder by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglucose groups per cellulose molecule).

The viscose is diluted to a 4% cellulose content and 600 ml. of the dilute viscose is placed in a bag of regenerated cellulose film. The dialysis bag which is used in this example consists of a 72 in. length of 0.8 in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hr. period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decausticized (pH 11), viscose is obtained. The decausticized viscose is fed through a commercial mixed flow spray dryer. The solution is atomized into the dryer and contacted with a high velocity heated air. In this drying operation the air inlet temperature is 130° C. and the air outlet temperature is 60° C. The rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns. The product which is obtained has a xanthate sulfur content of about 12.5% on cellulose and a D.P. which is substantially the same as the viscose feed stock. The dry powdered product is stable against xanthate decomposition for several days at room temperature and almost indefinitely when refrigerated to 0° C. The product has a pH less than 13 when dissolved or dispersed in water at 1% concentration and a D.S. greater than 3%.

In this example aged or ripened viscose was used. In other experiments unaged or unripened, blender viscose was used with similar reults. In fact, when blender viscose is used, both the feed and product xanthate sulfur contents are higher and the product more easily redissolved in water. If desired, the process can be carried out with specially prepared high xanthate viscose, having a xanthate D.S. in the range from 50 to 100% (i.e. 1.5 to 3.0 xanthate groups per anhydroglucose unit).

*Example 2*

In another experiment, the dialysis of viscose was carried out using an acid form cation exchange resin to maintain a high concentration gradient through the dialysis membrane to reduce the quantities of water required for the dialysis. A 60-in. long tube of regenerated cellulose was tied at one end to form an elongated bag. At the end of the bag was placed about 20 g. Amberlite I.R.C. 50 H (a carboxylic exchange resin in the acid form) and 50 ml. of water. The casing was then tied and additional amounts of water and ion exchange added and the bag again tied. This arrangement was repeated until a string of five batches of resin and water were obtained. This dialysis membrane containing acid form cation exchange resin beads was then placed in a wide mouth bottle containing 500 g. of viscose having a 4% cellulose content, produced by dilution of 8% cellulose content commercial blender viscose. The bottle was stoppered and shaken at 320 cycles per min. for 2½ hours. The shaker bed was maintained at a temperature of about 32° C. When the dialysis was complete, the dialysis membrane was removed from the bottle and the decausticized viscose solution which remained had a pH of 11.4. The dialyzed viscose which was thus produced was a viscous liquid of just barely pourable viscosity. The increase in viscosity was partially caused by decausticization but was also due to a ripening of the diluted viscose as a result of being held at a temperaure of 32° C.

The procedure just described is repeated and the product diluted to produce about 5 gallons of 2% cellulose content solution. The decausticized viscose solution is fed into a commercial concurrent down flow type spray dryer. The decausticized viscose is atomized into the dryer and mixed with heated air. The air inlet temperature is 146° C. and the outlet temperature 107° C. As previously described, the evaporation of water from the atomized droplets of viscose maintains the surface temperature of the droplets sufficiently low to prevent excessive decomposition of the cellulose xanthate.

The product which is obtained is a finely divided, dry (moisture content less than about 5%), stable, solid. The individual particles are spherical in shape and have an average diameter of about 10 microns. The product has a xanthate sulfur content of about 15% on cellulose and is easily dissolved in water. This product is stable for several days at room temperature and almost indefinitely under refrigeration.

The solid, stable, finely divided sodium cellulose xanthate produced in Examples 1 and 2 is easily dissolved in water to produce a solution which can be used for a variety of purposes. The reconstituted solution can be regenerated as a film or filament by conventional acid treatment or by thermal decomposition. The solution is very effective as an adhesive for wood or paper and as a wet or dry strength additive for paper.

About three drops of the reconstituted sodium cellulose xanthate solution (2% cellulose content) are applied per foot of 0.4 in. wide seam along one edge of a length of 14.5 lb. hemp paper. The paper is formed into a cylinder with the cellulose xanthate solution functioning as an adhesive. The seam which is formed is dried by heating for a time sufficient to cause the cellulose xanthate to decompose into regenerated cellulose. The seam has a rewet shear strength in excess of 10 lbs./linear inch of seam.

*Example 3*

In this and subsequent examples, the preparation of various spray dried ploymeric alcohol xanthates is described.

A high purity amylose (derived from corn) containing about 10% water and having a D.P. of about 700–900 is used in the formation of an alkali amylose xanthate solution similar to viscose.

An alkaline solution of 24% concentration (1580 g. water 300 g. sodium hydroxide) was prepared and mixed with 300 ml. methanol and 150 g. amylose. The slurry which formed was stirred for 10 min. and 200 ml. additional methanol added, and the more dilute slurry stirred for 1 hr. at 25° C. At that time, 5.1 liters of methanol were added to precipitate and shrink the amylose. The supernatant layer was decanted and found to contain 270 g. of sodium hydroxide. The gel which remained was allowed to dry in thin layers and to depolymerize or age. The alkali amylose which was produced was dried and aged for 43 hrs. at 25° C. to permit the preparation of relatively high concentration alkali amylose xanthate solutions. The gel weight was about 870 g. and comprised 12.6% alkali, 16% amylose, and 71% water.

The alkali amylose (870 g.) was spread on the bottom and on the porcelain plate of a 12 in. vacuum desiccator. Nitrogen purging was carried out and a vacuum was then applied. About 70 g. of carbon disulfied was drawn into the desiccator and the system allowed to stand in a water bath at 25° C. After about 5.25 hrs., the alkali amylose had turned to a carrot yellow-orange color. The vacuum was applied to the desiccator to remove excess carbon disulfide for a period of about 20 min. The product obtained consisted of 898 g. of sodium amylose xanthate. This material was refrigerated at −20° C. for 6 days before solutions were prepared from it.

A solution was prepared by mixing the sodium amylose xanthate with an equal weight of water for 2 hrs. using a 2½ in. marine type propeller as an agitator. The mixture was maintained at a temperature less than 15° C. during solution. The viscous xanthate solution was filtered through a muslin filter cloth and had a 6% alkali content (both free sodium hydroxide and combined sodium) and 8% amylose.

The amylose xanthate solution was diluted to a 2% amylose content and was decausticized by dialysis. The dialysis was carried out using the procedure described in Example 1 and produced a decausticized solution having a pH of 11.5.

A 2% decausticized solution of amylose xanthate, prepared as described above, is fed to a commercial downflow counter-current-type spray dryer. The amylose xanthate solution is sprayed into the dryer counter-currently to the flow of heated air. The air has an inlet temperature of 149° C. and an outlet temperature of 104° C. The air stream passing out from the dryer is passed through a secondary separation system for recovery of fines which are combined with the coarser product removed from the bottom of the spray dryer. The product which is produced consists of a stable, dry, solid comprising essentially decausticized sodium amylose xanthate. The product consists of very small, hollow spheres ranging from submicron size up to balloons in the range of 30 to 60 microns in diameter and has an average particle size in the range of 5 to 20 microns.

This product has a xanthate sulfur content equal to about 75% of the xanthate sulfur content of the feed solution. The amylose xanthate powder is easily dissolved in water to produce viscous solutions which are useful in the formation of regenerated amylose films and fibers. The reconstituted amylose xanthate solutions are also useful as adhesives for wood and paper and as wet and dry strength additives for paper. The powdered amylose xanthate product is stable for extended periods of time. If the powder is given an additional drying with extremely dry air at room temperature or by admixture with a desiccant material to reduce the water content to substantially zero there is substantially no loss of xanthate sulfur during storage at room temperature for several months.

*Example 4*

In this example, dilute sodium polyvinyl alcohol xanthate is decausticized and converted to a dry stable powder.

The sodium polyvinyl alcohol xanthate used in this example is prepared in accordance with the procedure of B. G. Ranby, described in Die Makromolekulare Chemie, November 1960, p. 68 ff. The sodium polyvinyl alcohol xanthate is diluted to a 2% polyvinyl alcohol content and purified by dialysis following the procedure described in Example 1. The dialyzed solution is a viscous liquid of pH 11.

The decausticized solution of sodium polyvinyl alcohol xanthate is then passed through a commercial concurrent up-flow spray dryer. The solution is atomized into the dryer into a stream of heated air. The air has an inlet temperature of about 163° C. and an outlet temperature of 104° C. Under these conditions the spray is converted to a finely-divided dry powder and recovered in the product collection system.

The sodium polyvinyl alcohol xanthate powder consists of hollow spherical particles ranging from submicron size to balloons having diameters of the order of 30 to 60 microns. The powder is stable on extended storage and is easily redissolved in water. A reconstituted solution of decausticized sodium polyvinyl alcohol xanthate is a viscous liquid which can be regenerated as a film or fiber and which is useful as an adhesive or as a wet and dry strength additive for paper.

Example 5

In this example, dilute sodium polyallyl alcohol xanthate is decausticized and converted to a dry stable powder.

The sodium polyallyl alcohol xanthate used in this example is prepared in accordance with the procedure of B. G. Ranby, described in Die Makromolekulare Chemie, November 1960, p. 68 ff. The sodium polyallyl alcohol xanthate is diluted to a 2% polyallyl alcohol content and purified by dialysis following the procedure described in Example 1. The dialyzed solution is a viscous liquid of pH 11.

The decausticized solution of sodium polyallyl alcohol xanthate is then passed through a commercial horizontal concurrent flow type dryer. The solution is atomized into the dryer into a stream of heated air. The air has an inlet temperature of about 163° C. and an outlet temperature of 104° C. Under these conditions the spray is converted to a finely divided powder and recovered in the product collection system.

The sodium polyallyl alcohol xanthate powder is finely divided and consists of hollow spherical particles ranging from submicron size to balloons having diameters of the order of 30 to 60 microns. The powder is stable on extended storage and is easily redissolved in water. A reconstituted solution of decausticized sodium polyallyl alcohol xanthate is a viscous liquid which can be regenerated as a film or fiber and which is useful as an adhesive or as a wet and dry strength additive for paper.

SPRAY DRYING OF XANTHATE SOLUTIONS DECAUSTICIZED BY CATION EXCHANGE

Viscose and analogous polymeric alcohol xanthate solutions can be purified and reduced in pH by treatment with cation exchange materials in the hydrogen ion or acid form. The free alkali in viscose (and related polymeric alcohol xanthate solutions) and a substantial portion of the combined alkali can be removed by neutralization with a cation exchange material in the hydrogen ion or acid form. In general, the reaction is carried out by merely mixing the viscose (or other xanthate solution) with the cation exchange resin which results in a rapid reaction removing most of the basic impurities.

Reaction which takes place is a simple neutralization reaction, is quite rapid, and seems to be limited only by the rate of diffusion of the alkali into contact with hydrogen ions diffusing from the ion exchange material. While the process is most effective when used with commercially-obtainable, high capacity ion exchange resins, it is effective to a substantial degree with any material having cation exchange properties, which material can be converted to the acid form by treatment with acid. In general, the neutralization of free alkali (and part of the combined alkali) in polymeric alcohol xanthate solutions can be carried out using cation exchange materials in a definite and predetermined manner with the result that the pH of the resulting material can be calculated in advance by an evaluation of the stoichiometry of the reaction.

The following ion exchange materials are illustrative of the cation exchangers which can be used in this process: sulfonated phenolic resins, e.g., Zeo-Karb 215, Zeo-Karb 315, Amberlite IR 1, Amberlite IR 100, Duolite C 10, Duolite C 3, Dowex 30; sulfonated polystyrenes, e.g., Zeo-Karb 225, Amberlite IR 120, Duolite C 20, Dowex 50, and Nalcite HCR; sulfonated coal, e.g., Zeo-Karb H 1; nuclear substituted phosphonate resins, e.g., Duolite C 60 and Duolite C 61; Carboxylic resins, e.g., Zeo-Karb 216, Zeo-Karb 226, Amberlite IRC 50, Duolite CS 100; acid treated Zeolites; naturally occurring non-resinous ion exchange materials, e.g., cellulose, wood fibers (bast fiber) including fabricated forms thereof such as webs, papers, fabrics, and the like. The reference to ion exchange resins is intended to be generic to ion exchange material of the high capacity resinous type, to liquid ion exchangers, and to naturally occurring non-resinous materials such as acid treated coal, cellulose wood fibers, fabrics, webs, papers, and the like which are known to have cation exchange properties.

When polymeric alcohol xanthate solutions are treated with ion exchange materials to neutralize free alkali (and sometimes part of the combined alkali) the resulting solution has a pH less than 13 and is capable of being spray dried as will be subsequently described. When a polymeric alcohol xanthate solution is decausticized to a pH less than about 9 some of the combined alkali is removed and the resulting product contains some acid xanthate groups. Consequently, when the product solution or the ultimate spray dried powder is referred to as a polymeric alcohol xanthate, the term is intended to be inclusive of acid xanthates (sometimes referred to as xanthic acids) of the specified polymeric alcohol in which some or all of the combined alkali has been removed.

The following non-limiting examples are illustrative of the preparation of stable, dry powders of polymeric alcohol xanthates by spray drying of xanthate solutions which have been neutralized or decausticized by cation exchange.

Example 6

An 8% cellulose content viscose, as used in Example 1, was diluted with distilled water to a 0.5% cellulose content. Amberlite IRC 50H resin beads were added intermittently to the diluted viscose with mechanical stirring over a period of about 10 min. at 25° C. until the pH reached a value of about 8. A clear, light-amber colored liquid resulted. The liquid was filtered through a muslin filter cloth and had a viscosity of 5.1 CP at high shear rates and 7.8 CP at low shear rates.

The decausticized viscose, prepared as described above, is fed into a concurrent or parallel flow, up-flow type spray dryer. The solution is atomized into a stream of hot air and rapidly converted into a dry stable powder. The air is supplied to the dryer at an inlet temperature of 144° C. and an outlet temperature of 104° C.

The product obtained from the spray drying operation is substantially dry (moisture content less than about 3%), stable sodium cellulose xanthate (including some xanthic acid groups). The xanthate sulfur content of the product is about 75% of that of the feed to the dryer. The drying operation results in a very slight loss of xanthate sulfur but produces a dry, stable powder which can be stored for extended periods of time at room temperature and almost indefinitely under refrigeration. The sodium cellulose xanthate powder is easily redispersed in water to form a sodium cellulose xanthate solution from which films or fibers can be regenerated or which may be used as an adhesive or a wet or dry strength additive for paper.

Example 7

In an additional series of experiments, viscose containing higher proportions of cellulose was treated with a cation exchange resin by passing the viscose through a column of resin designed for pressure operation. The column consisted of a 2 in. (O.D.) x 30 in. stainless steel tube provided with end caps having O-ring seals and 100 mesh stainless steel screens backed by 14 mesh screens for supporting the resin bed. In using the column, coarse glass wool was first placed over the screen and the bottom of the column. A portion of Amberlite IRC 50H resin was pretreated with water to prevent excessive compacting of the resin due to swelling on initial wetting. The moist resin was added to the column and tamped to minimize channeling during the ion exchange reaction.

In one experiment the column was partially filled with 150 g. of Amberlite IRC 50H resin. 600 g. of 2% cellulose content viscose was added to the column. The pressure on the column was gradually increased to 30 p.s.i.g. over about 5 min. 600 g. of decausticized viscose was eluted from the column in 3 min. after the pressure reached 30 p.s.i.g. The initial effluent from the column had a pH of 5.5. The final effluent from the column had a pH of about 8.4 which increased to 9.0 after about 4 hrs. storage.

In another experiment the column was charged with 100 g. of Amberlite IRC 50H covered with a 0.75 in. layer of Amberlite IRC 50Na. Next, 547 g. of 3% cellulose content viscose was introduced to the column and a pressure of about 60 p.s.i.g. applied. At the end of about 30 minutes, 540 g. of the viscose had been recovered. The initial effluent from the column had a pH of 5.0 which rose to 8.5 after the first 50 ml. The pH of the viscose remained at about 8.5 until completely eluted from the column and gradually increased to a value of 9.8 after about 3 hrs. at 25° C.

In another experiment a column was charged with 100 g. of Amberlite IRC 50H covered with a 0.5 in. layer of Amberlite IRC 50 Na. Then 700 g. of 2.5% cellulose content viscose was added to the column and a pressure of 55 p.s.i.g. applied. The entire 700 g. of viscose was eluted from the column in about 4.5 min. and had a pH of 12.5.

In other experiments, dilute viscose solutions (0.5% cellulose content) were passed through the column under gravity feed and under various pressures to produce decausticized viscose solutions of pH varying from 5 to 10.

Decausticized viscose solutions, prepared as just described, are spray dried using the apparatus described in Example 6, about. The viscose solution, in each case, is atomized into a stream of heated air. The air stream has inlet temperature of about 149° C. and an outlet temperature of about 104° C. As previously described, the evaporation of water from the individual droplets of solution maintains the surface temperature of the droplets (and the resulting solid particle) at a temperature not substantially in excess of the wet bulb temperature of the gas stream. The spray drying of the decausticized viscose solutions produces finely divided powders of sodium cellulose xanthate. The powder is a dry (moisture content less than about 3%) stable, solid material in the form of hollow spheres having diameters ranging from submicron size up to 60 microns in diameter. The dry solid product is stable for several days at room temperature and almost indefinitely under refrigeration. If the dry powder is dried further to remove substantially all of the water, the product can be stored almost indefinitely at room temperature.

The sodium cellulose xanthate powder produced as just described is easily dissolved in water to reconstitute a decausticized viscose solution. The solution thus prepared is useful as an adhesive for paper or wood and as a wet or dry strength additive for paper.

*Example 8*

In another experiment, a 0.8% cellulose content viscose was mixed with Dowex 50 WX8 sulfonic acid type resin in the hydrogen ion or acid form. The mixture was stirred for a few minutes and the decausticized solution recovered. The solution had a pH of 11.5 and did not coagulate or gel after storage for 24 hrs. at room temperature.

When this solution is spray dried as described in the previous example, a solid stable powder is obtained which is easily redissolved in water at the time and place of intended use.

*Example 9*

The composition of viscose (or similar polymeric alcohol xanthate solutions) which has been decausticized by cation exchange cannot be simply defined. The viscose starting material contains at least ten types of molecular species, many of which are in transient equilibrium. Ion exchange will, in general, shift these equilibria to give the free acids. The nature of the products also depends somewhat upon the speed of the ion exchange reaction or the contact time with the resin. This is because of the fact that, while the free sodium (or other alkali) ions in the viscose are being neutralized by the ion exchange to produce cellulose xanthic acids (also called cellulose acid xanthates), the resulting product will hydrolyze to produce additional amounts of free alkali. However, this hydrolysis takes time and the composition of the resulting product, therefore, varies somewhat with the time required for the neutralization or ion exchange reaction. The composition of the decausticized viscose also depends to some extent upon the time that it has been stored.

In a series of experiments, a 0.5% cellulose content viscose was neutralized or decausticized by treatment with Amberlite IRC 50H resin and samples obtained in a pH range from 9.3 down to 6.5.

Analysis of the decausticized viscose having a pH of 6.9 showed that the composition contained about 57% of its xanthate content in the form of acid xanthate groups. At a pH of 7.3 the viscose contained 56% of its xanthate content in the form of acid xanthate groups. Viscose which was decausticized to a pH of 8.1 was found to contain 17% of its xanthate content in the form of acid xanthate groups. On the other hand, viscose which was decausticized to a pH of 9.3 contained no free acid xanthate groups.

When the decausticized viscose samples taken at various pH levels are spray dried in the dryer described in Example 6, above, a stable, solid sodium cellulose xanthate powder is obtained.

In each case there is a slight loss in xanthate sulfur content of the product relative to the feed. This results from a partial decomposition of the xanthate. The viscose samples which correspond to viscose having all free alkali removed (pH of about 9.3) are spray dried most efficiently with a minimum decomposition of the xanthate. Viscose which has been neutralized to a lower pH is somewhat less stable and is preferably dried using higher velocity and lower temperature air. Viscose samples which have been neutralized to a pH in the range from 9.3 up to 13 are progressively less stable, with increasing pH of the solution, during the spray drying process. This is unexpected since the opposite is true with respect to the neutralized solutions. The solutions decrease in stability with decrease in pH below pH 13.

In this range (pH 9–13), there is a more severe loss of xanthate sulfur. Nevertheless, with proper selection of temperature and air velocities in the spray dryer, spray dried products can be produced which are solid, stable and easily redissolved. Viscose, and other polymeric alcohol xanthate solutions having a pH above 13 cannot be spray dried without almost total loss of xanthate sulfur. In fact, attempts to dry viscose and other polymeric alcohol xanthates having a pH above 13 results in almost total regeneration of the cellulose or other polymeric alcohol therefrom. In such a case, the powdered product which is produced cannot be redissolved or redispersed and is lacking in all of the desirable properties found in the spray dried decausticized product.

Example 10

This example demonstrates that naturally occurring organic ion exchange materials can be used with substantially equal success in decausticizing viscose in preparation for drying.

An 8% cellulose content viscose as used in Example 1 was diluted to a 0.3% cellulose content with distilled water. The diluted viscose was slurried with bast fibers which had been acid treated to convert the ion exchange sites therein to the acid or hydrogen ion form. At the end of 10 min., the slurry was filtered and the dilute viscose was recovered as a light amber colored solution of cellulose xanthate having a pH of about 9.0.

The decausticized viscose thus prepared is fed into a spray dryer as described in Example 6 above. In the dryer the viscose is atomized and passed into a stream of heated air. The air has an inlet temperature of 143° C. and an outlet temperature of 104° C.

The viscose spray is completely dried to produce a finely divided solid product which is stable on extended storage. The product is sodium cellulose xanthate in the form of hollow spheres ranging from submicron size up to ballons in the range of 30 to 60 microns in diameter.

Example 11

A series of experiments were carried out in spray drying decausticized viscose under a variety of feed conditions.

Viscose having a 7.7% cellulose content was decausticized to various pH levels in the range from about 6.5 to 12.3 using Amberlite IRC 50 ion exchange resin in the acid or hydrogen ion form. The decausticized viscose was diluted to a 2% cellulose content and spray dried in a dryer of the type described in Example 6 above.

The spray dried powders obtained in each of the runs contained about 65% cellulose and about 4% water. The product was a free flowing powder which is stable for several weeks at temperatures just below room temperature. Under refrigeration the powder is stable almost indefinitely. The sodium cellulose xanthate powder is very hygroscopic and must be protected against atmospheric moisture. The powders obtained in the various runs were further dried using various laboratory desiccants and also by extensive drying with bone dry air. Extensive drying with bone dry air has reduced the water content of the product to substantially less than 1%. The stability of the product is closely related to water content. The product tends to lose xanthate sulfur in the presence of moisture. The extremely dry product has a storage life of about six months or more at room temperature. In fact, the totally anhydrous product is stable even at moderately elevated temperatures for extended periods of time.

When various solid extender materials are mixed into the decausticized viscose prior to spray drying the resulting product consists of particles of solid cellulose xanthate dried on nuclei formed of the extenders. Pigments, sizing agents, dyes, antistatic agents, clays, etc., can be admixed with the decausticized viscose feed to produce a spray dried product containing the extender material. Kaolin clays have been mixed with decausticized viscose at clay:cellulose ratios of 0.5–2.0 to 1.0 and spray dried. The solid product was redispersed and/or dissolved in water and used to coat paper with no loss in strength relative to paper coated with the same cellulose loading but containing no clay. Likewise, the spray dried product may be admixed with pigments, buffers, anti-oxidants, sizing agents, dyes, anti-static agents, desiccants, cross linkers for cellulose, solid acids and the like.

Example 12

An 8% amylose content solution of sodium amylose xanthate is prepared as described in Example 3, diluted to a 2% amylose content, and neutralized and decausticized by contact with an ion exchange resin in the acid form. Decausticized solutions of sodium amylose xanthate are produced in this manner at pH values ranging from 10.5 down to 7.6 or lower.

Decausticized solutions of sodium amylose xanthate prepared as described above are spray dried in a manner described in any of the previous examples. The solutions are preferably atomized into a stream of heated air having an inlet temperautre of 143° C. and an outlet temperature of 102° C. The product obtained is dry, stable, decausticized sodium amylose xanthate powder.

Example 13

A dilute solution of sodium polyvinyl alcohol xanthate is prepared as described in Example 4, decausticized to a pH of 8.0 by admixture with a cation exchange resin in the acid form, and spray dried as in the previous example. The product is a dry stable powder of sodium polyvinyl alcohol xanthate and is easily dissolved or dispersed in water.

Sodium polyallyl alcohol xanthate solution is prepared as described in Example 5 decausticized, and spray dried as described above for the preparation of spray dried sodium amylose xanthate.

SPRAY DRYING OF POLYMERIC ALCOHOL XANTHATE SOLUTIONS DECAUSTICIZED BY ANION EXCHANGE

Viscose and similar polymeric alcohol xanthate solutions can be purified and decausticized by treatment with anion exchange material in a manner somewhat similar to the purification and decausticization using cation exchange resins. In the anion exchange treatment the material used is a strong-base or intermediate-base strength anion exchange resin in the salt form (non-hydroxyl form). When the viscose (or other xanthate) solution is contacted with an anion exchange resin in the salt form, the hydroxyl groups in the solution exchange with the ionizable salt groups on the resin. If the viscose solution is merely mixed with anion exchange resin, the hydroxyl groups from the solution will reach equilibrium with the salt groups ionized from the resin and there will be only a partial purification and decausticization of the solution. However, if the viscose (or other polymeric alcohol xanthate solution) is fed through a column containing the resin, a relatively high ion concentration gradient is maintained between the solution and the resin with the result that a substantially complete removal of hydroxyl ion from the solution is effected.

When an anion exchange resin is used in this manner for decausticizing viscose (or other polymeric alcohol xanthate solutions), it is effective not only to remove hydroxyl ions from the solution but also to remove the anions of contaminating by-products such as trithiocarbonates, mono- and dithio-carbonates, thiosulfates, perthiocarbonates, and sulfides which are produced as by-products in the xanthation process.

The treatment of viscose and similar solutions with anion exchange resins has the advantage of removing ionic by-products which tend to discolor the viscose but has the disadvantage of substituting the anion of the ion exchange resin for the hydroxyl ions in the solution with the result that the decausticized viscose contains an amount of sodium salts which is substantially equivalent to the alkali content of the viscose as initially formed. As a result, it is necessary to use anion exchange resins only in the form of salts of relatively strong acids so that the salt formed with the sodium ions is substantially neutral. In practice, the anion exchange process is preferably used to clean up a solution which has first been dialyzed or neutralized by cation exchange.

In carrying out the decausticization of polymeric alcohol xanthate solutions with anion exchange materials, any of the commercially available anion exchange resins can be used as well as naturally occurring materials which inherently possess anion exchange properties. Examples of anion exchange materials that can be used in the decausticization of polymeric alcohol xanthate solutions by anion exchange include but are not limited to the following: intermediate base anion exchangers, e.g., Dowex 2; strong base anion exchangers, e.g., De-Acidite FF, Amberlite IRA 400, Amberlite IRA 410, Dowex 1, Nalcite SAR; porous anion exchangers, e.g., Decolorite and Duolite S30, as well as naturally occurring anion exchangers, e.g., proteins containing ionizable amino groups, polymeric betaines, etc.

The following non-limiting examples are illustrative of the decausticization of polymeric alcohol xanthates by anion exchange:

Example 14

A glass column having an I.D. of 1 cm. was filled to a depth of 20 cm. with 50 mesh Dowex 1X4 ion exchange resin in the chloride form.

An 8% cellulose content viscose was diluted to 0.5% cellulose content and fed through the column under a pressure of 0.5 p.s.i.g. at a rate of 1 ml./min. The effluent from the column had a substantially constant pH of 11.8 and was a clear, colorless liquid.

This procedure was repeated using the same apparatus filled with Dowex 1X8 resin in the chloride form and the product was a clear liquid having a substantially constant pH of 11.8.

The decausticized viscose produced as just described is fed through a spray dryer as described in Example 6. The solution is atomized into a heated air stream having an inlet temperature of 115° C. and an outlet temperature of 60° C. The product obtained is a dry stable almost white powder comprising sodium cellulose xanthate containing a small amount of sodium chloride.

When dilute viscose was passed through an anion exchange column using other anion exchange resins, including Dowex 2X4 (chloride form), Amberlite IRA 400 (nitrate form), and Nalcite SAR (nitrate form), a decausticized product was obtained as described above.

When the decausticized product is spray dried, the resulting product is a dry stable white powder containing a small amount of a sodium salt impurity resulting from the introduction of the anion from the exchange resin. The anion exchange step is particularly effective in removing colored sulfur by-products. These colored by-products can also be removed by aeration of a cold solution which has been purified or decausticized by dialysis or cation exchange.

When the above procedure is repeated using solutions of sodium amylose xanthate, sodium polyvinyl alcohol xanthate, or sodium polyallyl alcohol xanthate, the solutions are readily decausticized and can be spray dried as described above.

SPRAY DRYING OF POLYMERIC ALCOHOL XANTHATE SOLUTIONS DECAUSTICIZED BY ION RETARDATION

Ion retardation resins constitute a new class of materials similar to ion exchange resins. They are prepared by polymerizing a cationic monomer inside the pores of an anion exchange resin of an anionic monomer inside the pores of a cationic exchange resin. The resulting linear polymer is trapped inside the cross linked ion exchange resin and cannot diffuse out. The resin system is physically and chemically stable and comprises a mixture of cation and anion exchangers with the mixing taking place at the molecular level.

In an ion retardation resin the ionic and cationic absorption sites are so closely associated that there is a partial neutralization of electrical charges in adjacent sites. However, the sites still have an attraction for mobile anions and cations and can associate with them to some extent. The result is that the resin will absorb both anions and cations from solutions with which it comes in contact, but the absorbed ions can be displaced from the resin by the use of water as an eluent. If the solution contains macromolecular ions, they cannot, in general, diffuse inside the resin beads, so a separation of small from large anions can take place. Ion retardation resins may be utilized in batch operations. However, since absorbed ions are only weakly held, their removal from solution is incomplete even in the presence of excess resin, and hence a column operation is generally preferred. In column operations, the solution to be treated is fed through the resin bed until the ion absorbing capacity of the bed is utilized as completely as possible. The absorbed ions are then eluted by rinsing the bed with water.

Example 15

In one experiment, a column of ion retardation resin was prepared using Retardion 11A8 (product of the Dow Chemical Company) which is a 50–100 mesh resinous material prepared by polymerizing acrylic acid inside Dowex 1 (a quaternary, strong base, styrene resin manufactured by the Dow Chemical Company). Before use, the resin was soaked in water to remove soluble impurities and to cause the resin to expand to its wet size. The preliminary washing of the resin is desirable to bring the resin bed to its full size and thus prevent variation in feed rate through the bed.

An 8% cellulose content (6% alkali) viscose was diluted to a 1% cellulose content for removal of alkali in the column. The dilute viscose was introduced into the top of the column and allowed to flow through by gravity. The eluent from the column had a pH of about 12 and was a clear colorless liquid. At a pH of 12, more than 99.9% of the free alkali in the viscose has been removed.

The recovery of the dilute viscose from the column was essentially quantitative and the decausticized product, substantially free of impurities, could be thermally regenerated into a coating or film.

When this decausticized solution is fed into a spray dryer as described and shown in FIG. 1, a spray-dried product is produced which is table over extended periods of time. The dilute solution is fed into the dryer through the atomizing nozzle into an air stream having an inlet temperature of 121° C. and outlet temperature of 60° C. The fine spray is quickly dried to produce a dry powder which is rapidly separated from the heated air before substantial decomposition of the xanthate can occur. The powder which is produced can be redissolved or redispersed in water or other substantially inert polar solvents and can be used as an adhesive for paper or wood or as a wet or dry strength additive in the manufacture of paper.

Example 16

A column of Retardion 11A8 resin is prepared as described in Example 15. An 8% amylose content solution of sodium amylose xanthate is prepared as described in Example 3 and diluted to a 1% amylose content solution. The dilute amylose xanthate solution is then allowed to flow by gravity through the resin bed. The effluent from the column has an average pH of about 12, which would represent substantially complete removal of all free alkali in the solution.

When this solution of decausticized sodium amylose xanthate is spray-dried using the dryer described in Example 6 a fine powder is obtained which is stable for extended periods of time at room temperature and almost indefinitely under refrigeration. The product can be redissolved or dispersed in water or other inert polar solvent and used as an adhesive or a wet-dry strength additive in the manufacture of paper.

SPRAY-DRYING OF VISCOSE AND OTHER POLYMERIC ALCOHOL XANTHATE SOLUTIONS DECAUSTICIZED BY LIQUID ION EXCHANGERS

In some cases, the use of a liquid ion exchanger is advantageous in continuously decausticizing viscose (or other polymeric alcohol xanthate solutions) because the liquid exchange medium can be continuously removed and regenerated.

Example 17

A liquid ion exchanger was prepared by dissolving 20 g. of monolauryl acid orthophosphate in 50 ml. of carbon tetrachloride. A turbid dispersion was produced. A 250 ml. beaker was charged with 100 ml. of dilute (0.5% cellulose content) viscose and the liquid ion exchanger slowly added with stirring.

As the materials were mixed, spontaneous emulsion took place and the pH decreased slowly to pH 9. The mixture was centrifuged to break the emulsion and decausticized viscose (pH 9) recovered as a clear, amber liquid.

When viscose which has been decausticized using a liquid ion exchanger as above described is fed into a spray dryer as described in Example 6 above, a dry, stable powder is obtained. The solution is atomized into a heated air stream having an inlet temperature of 116° C. and an outlet temperature of 60° C. The dry powdered product is stable for extended storage at room temperature and almost indefinitely under refrigeration.

When the dry powder is redissolved to reconstitute a decausticized viscose solution, the resulting solution can be regenerated into cellulose film or fiber (by thermal or acid regeneration) and can be used as a high wet and dry strength size for paper.

The liquid ion exchange process used in decausticizing the viscose in preparation for spray-drying can be similarly used in the decausticizing of other polymeric alcohol xanthates. Other liquid ion exchangers (both anion and cation type), well known in the art, can be used in this process.

SPRAY-DRYING OF VARIOUS POLYMERIC ALCOHOL XANTHATE SOLUTIONS DECAUSTICIZED BY VARIOUS MULTI-STEP PROCESSES

While the several processes of dialysis, cation exchange, anion exchange, ion retardation, etc., described above, are effective in decausticizing polymeric alcohol xanthate solutions, these processes are effective and in some cases more efficient when used in conjunction with one another. Thus, cation and anion exchange resins can be used for sequential treatment of various xanthate solutions, and mixtures of resins in the form of a mixed bed can similarly be used. Also, a combination of dialysis with cation or anion exchange is especially effective in decausticizing the various polymeric alcohol xanthate solutions. The decausticized solutions prepared by any such process can be spray-dried to produce exceptionally stable dry powdered materials.

Example 18

A 4% amylose-content, amylose xanthate solution was prepared as described in Example 3. About 100 g. of solution was placed in a regenerated cellulose bag and dialyzed by shaking the bag in 1.5 liters of water in a polyethylene bottle at 320 cycles per minute. The water was changed twice at 20-minute intervals; then it was changed again and the system left standing at 25° C. overnight.

The amylose xanthate solution was recovered from the dialysis bag as a viscous liquid having a pH of 11.5. The dialyzed solution (pH 11.5) recovered from the dialysis bag was mixed with Amberlite IRC 50H resin to remove additional sodium ions therefrom. The solution was separated from the exchange resin and found to have a pH of 6.5.

When the dialyzed and ion exchanged solution is spray-dried in the apparatus described in Example 6 above, using an air inlet temperature of about 127° C. and an outlet temperature of 66° C., a stable, solid, dry powder is obtained.

When the spray-dried powder is redissolved, a reconstituted amylose xanthate solution (pH 6.5) is obtained which is quite viscous and can be regenerated to produce a film or filament by acid treatment or by thermal regeneration.

Example 19

A 1% cellulose content viscose was subjected to dialysis as described in Examples 1 to 3 to produce a decausticized product having a pH of about 12. The decausticized viscose was then mixed with a cation exchange resin, Amberlite IR 120H, to further remove sodium ions therefrom. The solution which was recovered from admixture with the resin was a viscous, light-amber-colored solution of decausticized cellulose xanthate having a pH of about 6.

When this decausticized cellulose xanthate is spray-dried as described in Example 18, a dry, stable powder is obtained. As previously described, the spray-dried powder may be redissolved to produce a solution which is useful in the preparation of regenerated cellulose films or fibers or as a wet or dry strength size for paper.

Example 20

A 1% cellulose content viscose is subjected to dialysis as described in Examples 1 to 3 to produce a decausticized product having a pH of about 12. The decausticized viscose is then mixed with a cation exchange resin, Zeo-Karb 226, to further remove sodium ions therefrom. The solution which is recovered from admixture with the resin is a viscous, light-amber-colored solution of decausticized cellulose xanthate having a pH of about 6.

When this decausticized cellulose xanthate is spray-dried as described in Example 18, a dry, stable powder is obtained. As previously described, the spray-dried powder may be redissolved to produce a solution which is useful in the preparation of regenerated cellulose films or fibers or as a wet or dry strength size for paper.

Example 21

A 0.5% cellulose content viscose solution, freshly diluted, is fed through a solumn of Dowex 1X4 resin in the chloride form. A colorless effluent is recovered from the column having a pH slightly in excess of 12. The sulfur by-products in the viscose are removed in the form of a carrot-colored band near the top of the resin bed.

The effluent from the anion exchange column is then passed through a column containing Amberlite IRC 50H cation exchange resin to yield a colorless, odorless effluent. The solution recovered from the cation exchange column has an initial pH of 7.6.

When the pH 7.6 solution is spray-dried as described in Example 18, there is produced a stable, dry powder. This powder can be redissolved in water to produce a cellulose xanthate solution free of alkali and sulfur by-products which can be thermally regenerated or regenerated by acid treatment to produce films or fibers. The cellulose xanthate solution can also be used as a wet or dry strength additive for paper.

Example 22

A 1% cellulose content viscose solution, freshly diluted, is neutralized to pH 10 by admixture with Amberlite IRC 50H resin. The mixture is filtered to recover a fawn colored solution of cellulose xanathe.

The cation exchanged solution is then mixed with Dowex 1X4 anion exchange resin for a period of about 10 minutes. The solution which is recovered from the anion exchange resin is clear, colorless, and odorless, having a pH of about 10. The color-forming and odor-forming impurities are removed during the anion exchange treatment.

When the product solution is spray-dried as described in Example 18, there is produced a stable, dry, solid product. The dry powder which is produced is stable for extended periods of time at room temperature and almost indefinitely under refrigeration. As described in the previous examples, the spray-dried decausticized cellulose xanthate can be redissolved to produce solutions which are useful in the formation of films or fibers or as wet strength or dry strength additives for paper.

*Example 23*

In another experiment, a mixted bed ion exchange resin was prepared by mixing about 15 g. of Amberlite IRC 50H cation exchange resin with 13 g. of Doewx 1XOH anion resin. The mixed resin was added to 150 ml. of 1% cellulose content diluted viscose and stirred for ten minutes. The supernatant solution which was recovered was a clear, colorless solution having a pH of 7.2.

When this solution is spray-dried as described in Example 18, a dry, solid powder is obtained which is stable for extended periods of time at room temperature and almost indefinitely under refrigeration. As previously described, the spray-dried cellulose xanthate powder may be redissolved to produce a solution which can be used in forming regenerated cellulose films or fibers or as a wet or dry strength additive for paper.

USES OF DECAUSTICIZED POLYMERIC ALCOHOL XANTHATE POWDERS AND SOLUTIONS RECONSTITUTED THEREFROM

Decausticized viscose and other decausticized polymeric alcohol xanthates are useful for a variety of purposes for which the caustic materials would have little or no application. The decausticization of polymeric alcohol xanthate solutions reduces considerably formation of by-product materials upon regeneration of the polymeric alcohol as a film or fiber or for other suitable purposes. The decausticized polymeric alcohol xanthate solutions can be regenerated by treatment with acid as can the caustic or unpurified materials. The decausticized solutions, however, can be regenerated by treatment with acid to produce regenerated materials having a much smaller proportion of by-products than materials regenerated from the unpurified solutions. Furthermore, the decausticized xanthate solutions can be regenerated thermally to produce products which are largely free of by-product materials.

The decausticized solutions are somewhat unstable thermally and tend to gel upon storage for an extended period of time. When the solutions are spray-dried, as described above, the dry solid powder which is produced is stable at room temperature for extended periods of time and almost indefinitely under refrigeration. When the stable, solid, decausticized xanthate powder is redissolved, solutions are obtained which are useful in the preparation of regenerated polymeric alcohol films and fibers and as wet and dry strength additives for papers and for other purposes as will be subsequently described.

Xanthate materials which have been decausticized and spray-dried with a substantial reduction in xanthate sulfur content may still be useful if the materials contain xanthate sulfur at a D.S. of at least 3%. Materials having a low D.S. but in excess of 3% may not be wholly soluble in water but in many cases swell to a sufficient extent when mixed with water to make the powders useful as adhesive gelatinous sizing materials for use in the preparation of paper.

In view of the very large number of applications of the decausticized polymeric alcohol xanthate powders and the solutions reconstituted therefrom, it is desirable to set forth a number of such uses in more detail.

*Example 24*

A clear dilute (0.7% cellulose content) solution of cellulose xanthate having a pH of 11.6 is prepared by dissolving in water a decausticized cellulose xanthate powder prepared by the process described in Example 11. This dilute decausticized cellulose xanthate solution is used to coat the fibers in papers to produce a high wet and dry strength product. Several types of paper and several coating techniques can be used.

Papers which are treated in accordance with this example include a 15-pound (25.5 g./m.$^2$) hemp paper, starchsized onionskin paper, and ten-pound (17.0 g./m.$^2$) wood pulp paper. Portions of each paper are coated with decausticized cellulose xanthate solution by dipping, by floating the paper on the cellulose xanthate solution, and by spraying the solution on both sides of the paper. The several papers which are coated are dried at 80° C.–100° C. for several minutes. The wet strength of the paper increases from 10–15 fold in the cellulose addon range of about 0.5–4%. The dry strengths of the papers are increased from 20–50% in the same range. The dry burst strengths are increased two-fold while the wet burst strengths are increased up to eight-fold.

A 14.5-pound (24.2 g./m.$^2$) wood fiber tissue paper is impregnated with varying amounts of decausticized cellulose xanthate. The untreated tissue papers have a dry strength of 1890 g./cm. and a wet strength of 52.4 g./cm. The tissue paper is coated by floating a length of 15.25–22.85 cm. of the paper on the surface of a solution of decausticized cellulose xanthate in a flat pan. The paper is then passed under an aluminum roller and vertically into a flash dryer consisting of three infra-red quartz rods on each side of the paper perpendicular to the direction of travel and in a plane parallel thereto. The oven is only 40.6 cm. long and the paper is in the oven for 30 seconds. Oven air temperature is 180° C. and the paper is moved through in a single pass.

Generally, the paper is dry to the touch just before exit from the infra-red oven and may be rewound after leaving the oven. The solution used to treat the paper is a 1% cellulose content solution prepared by redissolving a powder prepared as in Example 11. A portion of the tissue paper is coated to a 4% cellulose addon and heat cured. The wet strength of the impregnated or coated paper has increased to a value of 498 g./cm. Another portion of the paper is coated to a 0.5% cellulose addon and cured as described above. This paper has a Scott wet strength of 441 g./cm. Another portion of the paper is impregnated to a cellulose content of 0.6% and heat cured as described above. The Scott wet strength of the paper has increased to a value of 302 g./cm.

A chapped rayon-hemp (50:50) tissue paper is float-coated as described above to a 0.5% cellulose content with a solution prepared by redissolving a decausticized cellulose xanthate powder prepared from a viscose which was decausticized to a pH of 7.4 by cation exchange and spray-dried as described in Example 11. The coated paper is dried in an infra-red oven as described above and has a Scott wet strength of 133 g./cm. as compared to a wet strength of 14 g./cm. for the untreated paper. A 15-pound (25.5 g./m.$^2$) all-wood-pulp tissue containing 0.1% Triton X-100 wetting agent is coated with the same solution to produce a 3.3% cellulose addon. After drying, the paper has a Scott wet strength of 348 g./cm. as compared to 58 g./cm. for the untreated paper.

A portion of the 15-pound (25.5 g./m.$^2$) tissue paper containing Triton X-100 wetting agent is float-coated with a 1% decausticized amylose xanthate solution (pH 11.6) produced by redissolving an amylose xanthate powder prepared as described in Example 13. The coated paper is dried in an infra-red oven as described above and has a wet strength of 96 g./cm. compared to 58 g./cm. for the untreated paper.

Various types of paper are coated or impregnated with solutions of decausticized cellulose xanthate prepared by redissolving decausticized cellulose xanthate powder, using a spray coating technique. The decausticized cellulose xanthate solution is applied to the paper using a paint sprayer. The spray can be applied in some cases to a single side of the paper while in other cases sprays may be applied to both sides of the paper. The coated paper is dried using an infra-red oven as described in connection with the float-coating process. At cellulose addons in the range from 1 to 2%, the wet strength of the paper ranges from 197 to 394 g./cm. (Scott test) as compared to 44.5 g./cm. for the untreated paper.

It has been found that papers impregnated or coated with solutions of decausticized cellulose xanthate are increased substantially in wet and dry strength regardless of the process by which the original viscose solution was decausticized. Thus, solutions prepared from powders which were spray-dried from viscose decausticized by dialysis or by anion or by cation exchange or by ion retardation are effective as wet and dry strength additives for paper.

There are some minor differences between the decausticized cellulose xanthate solutions produced by the various processes, but the compositions are all effective wet and dry strength additives. In general, solutions prepared from material obtained by spray-drying of viscose decausticized by cation exchange give slightly higher wet strength to paper than solutions prepared from powders made by spray drying viscose decausticized by the other processes. This appears to result from the fact that when viscose is treated with a cation exchange material the pH is substantially lower and the cellulose can be regenerated more quickly either by acid treatment or by thermal treatment.

On the other hand, viscose solutions which are neutralized or decausticized by dialysis or anion exchange or ion retardation have the advantage that objectionable odors and colored by-products are removed which are not always removed in the cation exchange treatment. This advantage is also present in the solid products produced by spray drying such decausticized viscose solutions. Of course, as described above, various combination processes may be used to take advantage of the best features of the various above-described decausticization techniques.

Example 25

A cellulose impregnated high wet strength paper is prepared by impregnating a long fiber hemp tissue paper with decausticized cellulose xanthate (or amylose xanthate) as above described and regenerating the same by acid or thermal treatment.

The paper is continuously formed into tubes (in accordance with commercially used procedures for forming fibrous casings) and impregnated with the decausticized cellulose xanthate solution to a very high cellulose content (paper represents only about 40% wt. of finished product). Alternately, the paper may be formed into tubes and treated with ordinary viscose as in the commercially used procedure for forming fibrous casings. The impregnated tubing is passed through an acid regenerating bath which converts the viscose or decausticized cellulose xanthate solution into regenerated cellulose. At equivalent viscosites, a solution of decausticized cellulose xanthate will penetrate hemp tissues about twice as fast as untreated viscose.

Example 26

A solution of decausticized cellulose xanthate was applied to bast fiber in its acid form to produce a coated fiber in which cellulose addons in the range from about 0.5 to 4.5% were obtained. In one experiment a bast fiber paper in the acid form was float-coated with untreated viscose, and decausticized viscose was formed in situ by reaction with the ion-exchange sites on the paper. This coating technique was effective to provide a 1-2% cellulose addon within and around the fibers of the paper. The cellulose can be regenerated by simple storage of the coated fiber at moderately elevated temperatures or by drying at temperatures of the order or 100° C.

Example 27

A solution of decausticized cellulose xanthate is mixed with paper pulp in the formation of paper to promote exhaustion of basic resins onto the paper. The decausticized cellulose xanthate solution can also be used as a beater additive in a paper machine. Upon regeneration, the cellulose acts as a binder for the resin and the paper.

Example 28

When decausticized cellulose xanthate powder is mixed with wood pulp and treated with iodine or a hypochlorite or peroxide, the xanthates are oxidized to xanthides which function as wet and dry strength sizes for the paper which is produced from the pulp.

Solutions of decausticized cellulose xanthate have been oxidized to xanthide gels by treatment with 0.05 N Iodine-KI, saturated aqueous calcium hypochlorite, and by 2% hydrogen peroxide. It has also been found that the decausticized xanthate solutions can be oxidized to xanthide gels with 2% hydrogen peroxide in concentrations as low as 0.2% cellulose.

Example 29

Spray-dried decausticized cellulose xanthate powders can be used in the preparation of high wet strength papers for use in making fibrous meat casings and for tea bags as well as for other applications.

To improve viscose penetration, it is possible to use a paper furnish containing all-rayon fiber or cross-linked rayon, which fibers are of cylindrical or near cylindrical shape and of a length approximating that of hemp fibers.

It is also possible to use fibers from hard woods which do not ordinarily give strong papers because because of the short fiber length. However, hardwood fibers give a paper which is more porous and less dense in structure than soft wood papers. The strength of a paper web formed from hardwood fibers can be substantially increased by treatment with a solution of decausticized cellulose xanthate followed by either thermal or acid regeneration. Cellulose loadings as low as 0.1 to 1% are sufficient to produce a grade A paper either from a beaten or unbeaten hardwood furnish.

Example 30

Foaming agents of the type used in producing cellulose sponges can be incorporated into a solution of decausticized cellulose xanthate and the solution used to coat fibers used in the preparation of paper. Paper produced from such coated fibers has extremely low bulk density and is quite porous.

Example 31

Thin papers, regenerated cellulose films, and other webs are coated with a solution of decausticized cellulose xanthate, and laminated under heat and pressure. The decausticized cellulose xanthate solutions can also be used as laminating adhesives for paper, cellulose films, and other webs, by acid regeneration processes.

Example 32

When solutions of decausticized cellulose xanthate are used to treat paper to improve the wet and/or dry strength of the paper, it has been found that the grain ratio of the paper is substantially improved. Papers which have been treated in this manner to improve wet and/or dry strength have higher transverse to longitudinal strength ratios than the untreated paper or paper treated with other wet or dry strength additives.

Example 33

A solution of decausticized cellulose xanthate, which has been decausticized to a pH of about 6 or which has been subsequently converted to the ammonium cellulose xanthate derivative, is particularly useful in treating tea bag paper stock to produce high wet strength tea bag paper which is free of objectionable odor, colors and taste.

Example 34

Decausticized cellulose xanthate solutions can be used as binders for activated carbon to coat carbon on a paper substrate. Using this decausticized cellulose xanthate solution, it is possible to produce paper products containing 65% activated carbon in which the binder material does not block the carbon pores.

*Example 35*

Solutions of decausticized cellulose xanthate may be applied to a substrate of a film, fiber, or other suitable form and insolubilized after application by oxidation of the xanthate before all of the xanthate has been decomposed in a thermal regeneration process. Such oxidation can be accomplished with iodine, hydrogen peroxide, hypochlorite, etc. This application of the decausticized cellulose xanthate solution differs from Example 28 in that the solution is applied at a time when it is fully soluble and can penetrate into the crevices of the substrate before oxidative cross linking renders it insoluble.

*Example 36*

Finely-divided or microcrystalline cellulose can be bonded to paper using solutions of decausticized cellulose xanthate to produce opaque papers of varying low basis weights. Such papers are particularly useful in reducing postage costs for various printed publications.

*Example 37*

Solutions of decausticized cellulose xanthate (or other polymeric alcohol xanthates) may be applied to a substrate of a film, fiber, paper, or other suitable form, and insolubilized after application by treatment with a polyvalent cation to produce a highly cross-linked xanthate derivative of the cation. Thus, paper or similar material may be impregnated with a solution of decausticized cellulose xanthate and treated with zinc chloride, barium chloride, ferric chloride, or similar soluble salts of polyvalent cations to cross-link the xanthate.

In the many examples given above, the solutions used were prepared from the spray-dried decausticized viscose or other polymeric alcohol xanthates. In most instances, the decausticized xanthate solutions which were used as a feed to the spray dryer could be used for the same purpose as the reconstituted solution prepared from the dried product.

While most of the procedures described above have involved aqueous reaction media, it should be noted that many of the reactions can be carried out in non-aqueous media. For example, cellulose xanthate dissolved in a non-aqueous solvent such as ethylene chlorohydran or mixtures of ethylene chlorohydran with water can be decausticized and subsequently spray dried as described above. The many applications of decausticized viscose, or solutions made from dry powders produced by spray drying of decausticized viscose, are equally applicable as uses for decausticized amylose xanthate solutions and other decausticized polymeric alcohol xanthate solutions, whether specially prepared or reconstituted from the spray dried powders.

While this invention has been described with reference to several specific embodiments, it should be understood that within the scope of the appended claims, this invention may be practiced otherwise than as specifically described herein.

What is claimed is:

1. A method of treating paper which comprises contacting paper fibers with a decausticized solution of a polymeric alcohol xanthate having a pH less than 13, and being substantially free of salts derived from free alkali in the solution, and treating the xanthate solution to insolubilize a polymer on the paper.

2. A method in accordance with claim 1 in which a polymeric alcohol is regenerated on the paper by treatment with acids.

3. A method in accordance with claim 1 in which a polymeric alcohol is regenerated thermally on the paper.

4. A method in accordance with claim 1 in which a polymeric alcohol xanthide is precipitated on the paper by oxidation.

5. A method in accordance with claim 1 in which a polymeric alcohol xanthide is precipitated on the paper by treatment with a polyvalent metal compound.

6. A method in accordance with claim 1 in which the xanthate solution is added to the paper pulp at the wet end of the paper machine.

7. A method in accordance with claim 1 in which the xanthate solution is added to the paper after formation of a pulp sheet.

8. A method in accordance with claim 1 in which the xanthate solution is a decausticized viscose, amylose xanthate, starch xanthate, polyvinyl alcohol xanthate, or polyallyl alcohol xanthate.

9. A method in accordance with claim 1 in which the xanthate solution is reconstituted from a dry powder produced by spray drying a decausticized viscose, amylose xanthate, starch xanthate, poly vinyl alcohol xanthate, or polyallyl alcohol xanthate solution.

10. A method in accordance with claim 1 in which the treated paper is formed into tubing, impregnated with viscose, and cellulose regenerated therein to produce a paper reinforced regenerated cellulose casing.

11. A method in accordance with claim 1 in which the xanthate solution is applied to preformed paper as a coating.

12. A method in accordance with claim 11 in which the solution contains a finely divided particulate extender which is bonded to the paper on insolubilization of said polymer.

13. A method in accordance with claim 12 in which said extender is a pigment.

14. A method in accordance with claim 12 in which said extender is a clay.

15. A method in accordance with claim 12 in which said extender is carbon.

16. A method in accordance with claim 12 in which said extender is finely divided particulate cellulose.

17. A paper product produced in accordance with claim 1.

18. A paper product produced in accordance with claim 2.

19. A paper product produced in accordance with claim 3.

20. A paper product produced in accordance with claim 4.

21. A paper product produced in accordance with claim 5.

22. A paper product produced in accordance with claim 10.

23. A paper product produced in accordance with claim 12.

References Cited

UNITED STATES PATENTS

| 1,852,466 | 4/1932 | McConnell | 260—218 |
| 1,870,259 | 8/1932 | McKee | 117—157 X |
| 1,880,041 | 9/1932 | Richter et al. | 260—218 |
| 1,880,286 | 10/1932 | Schur | 117—157 |
| 1,974,755 | 9/1934 | Schur | 260—218 |
| 2,045,349 | 6/1936 | Goodman | 117—86 |
| 2,045,410 | 6/1936 | Richter et al. | 117—157 |
| 2,422,573 | 6/1947 | Lilienfeld | 117—62.1 X |
| 2,805,196 | 9/1957 | Roebersen et al. | 204—151 |
| 2,825,655 | 3/1958 | Meadows | 260—216 X |

WILLIAM D. MARTIN, *Primary Examiner.*

H. W. MYLIUS, M. LUSIGNAN, *Assistant Examiners.*